United States Patent [19]

Joel, Jr.

[11] 4,317,193
[45] Feb. 23, 1982

[54] TIME DIVISION NODAL SWITCHING NETWORK

[75] Inventor: Amos E. Joel, Jr., South Orange, N.J.

[73] Assignee: Bell Telephone Laboratories, Incorporated, Murray Hill, N.J.

[21] Appl. No.: 117,830

[22] Filed: Feb. 4, 1980

[51] Int. Cl.$^3$ ............................................. H04Q 11/04
[52] U.S. Cl. ........................................ 370/54; 370/58
[58] Field of Search ............................. 370/54, 58, 63; 179/18 J

[56] References Cited

U.S. PATENT DOCUMENTS

| | | | |
|---|---|---|---|
| 3,729,593 | 4/1973 | Altenburger et al. | 179/18 |
| 3,906,175 | 9/1975 | Joel | 179/18 |
| 3,916,124 | 10/1975 | Joel | 179/18 |
| 4,022,982 | 5/1977 | Hemdal | 370/54 |
| 4,038,497 | 7/1977 | Collins et al. | 370/54 |
| 4,198,546 | 4/1980 | Schlichte | 370/58 |

OTHER PUBLICATIONS

"Nodal Switching Networks", Article No. 312, by A. E. Joel, Swedish 7th International Teletraffic Congress; Jun. 13–20, 1973.

*Primary Examiner*—Douglas W. Olms
*Attorney, Agent, or Firm*—H. R. Popper

[57] ABSTRACT

A switching network containing a plurality of nodal crosspoint configurations (NCCs) through which connection paths may be established to link together a plurality of different pairs of calling and called terminating circuits is disclosed. This space division nodal network is reconfigured on each of a plurality of repetitive time slots so that the same crosspoint of a given NCC (except the crosspoints associated with the nodes's terminating circuits) may serve a different call on each time slot. Four wire paths are provided, however, to each terminating circuit by assigning separate "going" and "return" time slots to each direction of transmission. A usage count is accrued showing how many independent calls are contained in the network on each time slot. When a path for a new call is to be established, the least busy time slot is selected, and then a link path to connect calling and called terminating circuits is chosen using the least busy intervening NCCs lying in the most direct available path.

11 Claims, 12 Drawing Figures

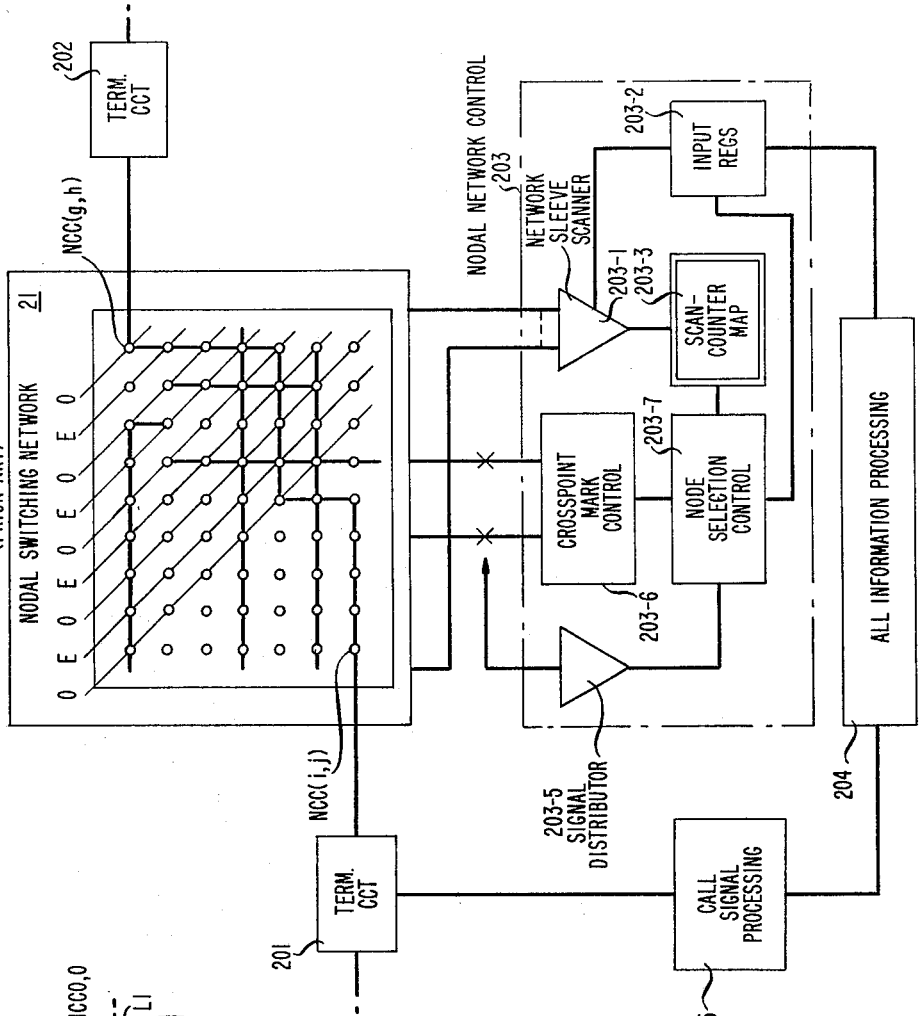
FIG. I (PRIOR ART)
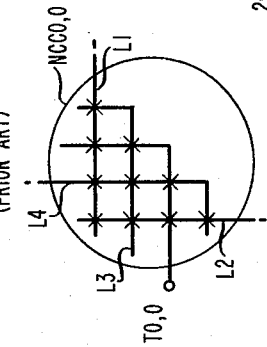
FIG. 2 (PRIOR ART)

FIG. 3
(PRIOR ART)

9×7 SECTION
OF ARRAY 21

FIG. 4
(PRIOR ART)

SCAN COUNTER
MEMORY MAP
ROW HALF-COUNT
OF BUSY LINKS

| 7 | 6 | 5 | 4 | 3 | 2 | 1 | 0 | 0 |
|---|---|---|---|---|---|---|---|---|
| 3 | 3 | 3 | 3 | 3 | 3 | 2 | 1 | 0 |
| 2 | 2 | 2 | 2 | 2 | 2 | 1 | 1 | 0 |
| 11| 10| 9 | 8 | 7 | 6 | 4 | 3 | 1 |
| 2 | 2 | 2 | 2 | 2 | 2 | 1 | 1 | 0 |
| 9 | 8 | 7 | 6 | 5 | 4 | 2 | 1 | 0 |
| 1 | 1 | 1 | 1 | 1 | 1 | 0 | 0 | 0 |

FIG. 5
(PRIOR ART)

SCAN COUNTER
MEMORY MAP
COLUMN HALF-COUNT
OF BUSY LINKS

| 1 | 1 | 1 | 1 | 1 | 1 | 1 | 0 | 0 |
|---|---|---|---|---|---|---|---|---|
| 1 | 1 | 1 | 1 | 1 | 2 | 2 | 1 | 0 |
| 1 | 1 | 1 | 1 | 1 | 3 | 2 | 2 | 0 |
| 2 | 2 | 2 | 2 | 2 | 5 | 3 | 4 | 1 |
| 2 | 2 | 2 | 2 | 2 | 6 | 3 | 5 | 1 |
| 3 | 3 | 3 | 3 | 3 | 8 | 4 | 6 | 1 |
| 3 | 3 | 3 | 3 | 3 | 9 | 4 | 6 | 1 |

FIG. 6
(PRIOR ART)

SCAN COUNTER
MEMORY MAP
COMBINED
HALF-COUNT

| 8 | 7 | 6 | 5 | 4 | 3 | 2 | 0 | ⓪ |
|---|---|---|---|---|---|---|---|---|
| 4 | 4 | 4 | 4 | 4 | 5 | 4 | 2 | ⓪ |
| 3 | 3 | 3 | 3 | 3 | 5 | 3 | 3 | ⓪ |
| 13| 12| 11| 10| 9 | 11| 7 | 7 | ② |
| 4 | 4 | 4 | 4 | ④ | ⑧ | ④ | 6 | ① |
| 12| 11| 10| 9 | ⑧ | 12| 6 | 7 | 1 |
| ④| ④| ④| ④| ④ | 10| 4 | 6 | 1 |

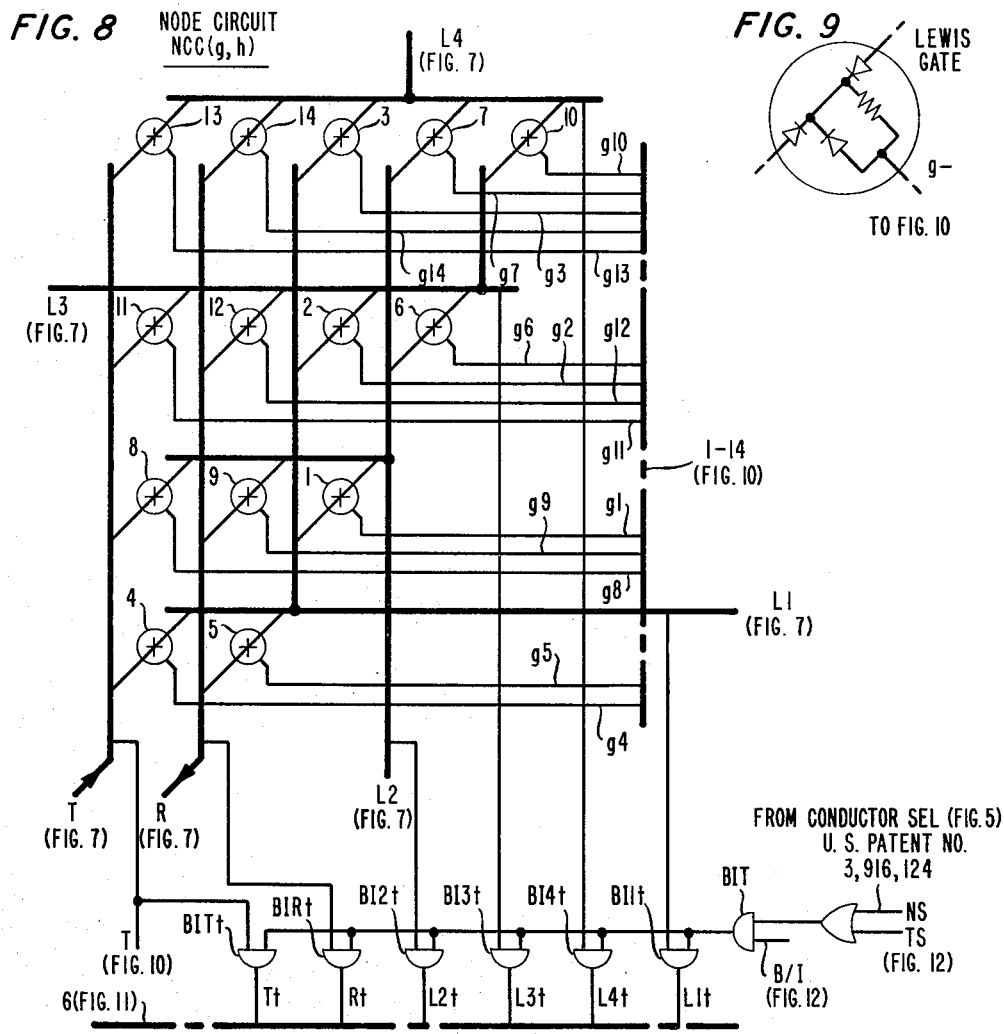
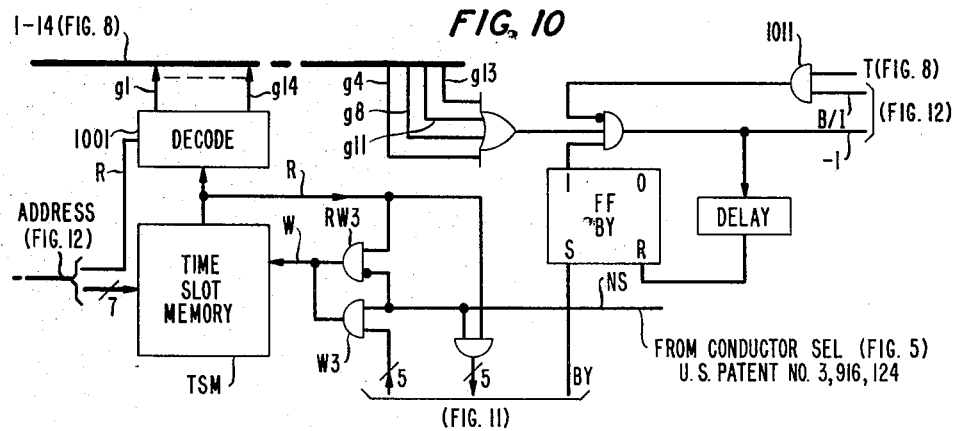

TIME DIVISION NODAL SWITCHING NETWORK

BACKGROUND OF THE INVENTION

1. Field of the Invention

This invention relates to switching networks and, more particularly, to the type of network which is sometimes known as a nodal or equi-interconnectable switching network. Such switching networks are distinguished from the more well-known plural-stage network arrangements (which are usually engineered to conserve the amount of crosspoints employed) by the fact that the terminations (input and output points) in a nodal network are distributed more or less homogeneously throughout the switching array. Each termination is associated with a respective nodal crosspoint configuration (NCC), which is connected by links to the adjoining NCCs in the switching plane.

2. Description of the Prior art

In one kind of prior art nodal network such as described, for example, in my U.S. Pat. No. 3,916,124, entitled "Nodal Switching Network Arrangement and Control", issued Oct. 28, 1975, each NCC is equipped with the minimum number of crosspoints (10) for establishing connections to and from adjoining NCCs located in any of the four cardinal directions linked to the given NCC, or for establishing a connection from the termination associated with the given NCC to any adjoining NCC in one of these cardinal directions.

In my prior U.S. Pat. No. 3,906,175 entitled, "Multiple Link Nodal Switching Network", issued Sept. 16, 1975, a plurality of links connect each NCC to adjoining NCCs in the cardinal directions in order to provide adequate traffic capacity with low probability of blocking.

In my presently copending U.S. patent application Ser. No. 905,214, filed May 12, 1978, entitled, "Nodal Switching Network with Binary Order Links", each NCC is connected not only to the immediately adjacent NCC in each of the cardinal directions of the switching plane, but is also directly connected to more distant NCCs in these directions by links whose lengths are ordered according to powers of the binary base two. This reduces the number of intermediate NCCs which must be involved in connecting a calling to a called termination.

In all of the foregoing nodal network configurations, and in the prior art U.S. Pat. No. 3,729,593, to O. Altenburger et al., issued Apr. 1973, the maximum number of simultaneously existing connections which the network is capable of supporting is limited by the available number of wire paths linking the NCCs. It would be extremely advantageous to achieve an enhanced degree of traffic handling capacity beyond that exhibited by these prior art nodal switching configurations.

SUMMARY OF THE INVENTION

I have devised an improved nodal switching network and control therefor in which each of the switching nodes and links operates on a time division basis and in which the nodes may be involved in handling originating, terminating, or switched-through connections or combinations of switched-through and either originating or terminating connections. Highspeed bidirectional gates are employed to perform the crosspoint function in the NCCs of the network passing digital signals; any necessary conversion of analog signals to digital form or buffering of signals arriving in digital form being performed at the termination circuit associated with the NCC. The number of digital gate crosspoints in each NCC is increased to 14 so that the termination associated with an NCC may have independent ("4-wire") access for each direction of communication with the links to adjoining NCCs.

It is an aspect of the illustrative embodiment of my invention that each NCC include a local crosspoint memory including a word for each network time slot which defines those NCC crosspoints that may simultaneously be operated in the time slot to effect noninterfering connections through the NCC. Such noninterfering connections may comprise the use of an NCC both to provide a through-switched path between adjoining NCCs as well as in a path extending the termination associated with the NCC to an adjoining NCC.

BREIF DESCRIPTION OF THE DRAWING

The foregoing and other objects and features of the invention may become more apparent from the reading of the ensuing description and drawings in which:

FIG. 1 shows the nodal switching network and control of my prior art U.S. Pat. No. 3,916,124.

FIG. 2 shows an enlarged view of the prior art nodal crosspoint configuration (NCC).

FIGS. 3 through 6 taken together show the manner in which the link busyness map of the prior art patent was constructed.

FIG. 8 shows the nodal crosspoint configuration (NCC) of the present invention.

FIG. 9 shows an enlarged view of the prior art Lewis-gate employed as a crosspoint in the nodal crosspoint configuration of the illustrative embodiment.

FIG. 10 shows a portion of the control for the nodal crosspoint configuration of FIG. 8, including the time slot memory thereof.

OVERVIEW OF NODAL NETWORK

Figure 7:
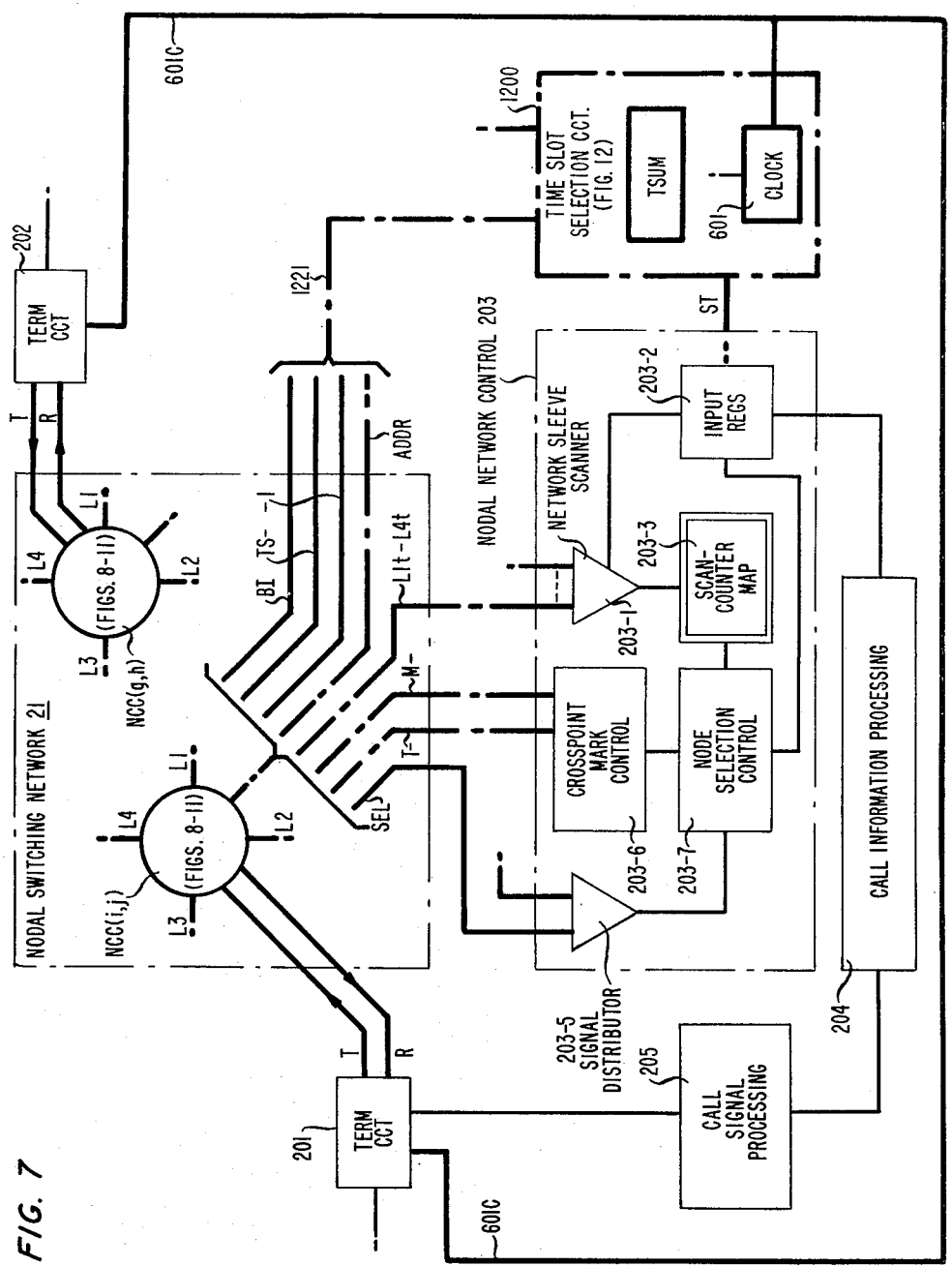
FIG. 7 shows the new time division nodal switching network of the present invention, and the control therefor in block diagram form.

A better understanding of my present invention may be had by first briefly reviewing the main structural elements employed in the nodal switching network disclosed in my prior U.S. Pat. No. 3,916,124 (hereinafter referred to as the '124 patent). In FIG. 1, which was FIG. 2 of the prior patent, a nodal switching network 21 is shown as comprising an equi-interconnectable array of nodal crosspoint configurations (NCCs). Each NCC, shown in somewhat greater detail in FIG. 2, is a switching entity at which calls may be originated, terminated or switched-through. Calls are originated or terminated at the associated termination circuit 201,202. For simplicity only the nodes located at network coordinates i,j and g,h, and therefore designated as node NCC (i,j) and node NCC (g,h), respectively, are shown equipped with terminating circuits 201 and 202, respectively. In the ensuing description, it will be convenient to assume that the first-mentioned node is a calling node and that the second-mentioned node is a called node. The nodal network 21 offers a great variety of possible paths of different lengths that can be constructed between a calling node and a called node. The control mechanism for constructing these paths is contained in the nodal network control 203. Initially, the control mechanism attempts to select one of the minimum length paths between the calling and called terminations and, if no such path is available, an attempt is made to establish a path even though it may not be of minimum length.

Nodal network control 203 is comprised of six principal parts. Electronic scanner 203-1 operates to monitor the busy/idle state of the links between the nodes of network 21 so that when the address of a called node is entered into input register 203-2 from the call information processing system 204, the scanner 203-1 will be able to enter the busy/idle information into scan counter memory map 203-3. The manner in which data is accrued in the scan counter memory map will be reviewed in greater detail hereinafter.

In addition to scanner 203-1, nodal network control 203 includes a signal distributor 203-5 which can be operated by node selection control 203-7 to connect the link testing and crosspoint control leads of any NCC in network 21 to the crosspoint mark control circuit 203-6. Node selection control 203-7 examines the scan counter map 203-3 and, based on the link busy/idle condition, employs its internal selection logic circuitry to determine which crosspoints in network 21 are to be operated. The details of the node selection control circuitry are shown in FIGS. 5 and 6 and 8 through 12 of the '124 patent.

An overview of the operation of scan counter memory map 203-3 of the '124 patent may be most easily obtained by referring now to FIGS. 3 through 6, which correspond to FIGS. 2A through 2D of that patent. In the aforementioned '124 patent, after the nodal network control 203 has been furnished the calling and called telephone numbers and the addresses of their corresponding terminations in the nodal switching network 21, a link "busyness" map is constructed. Briefly, the scanner 203-1 ascertains the number of the busy links at each node lying in a rectangular sector intervening between the calling and called nodes and enters into cells of a scan counter map 203-3 corresponding to each of the nodes in the sector cumulative counts of the busy links present at each of the intervening nodes. The cumulative counting is begun at the called node and is accrued at each intervening node progressing in the direction toward the calling node. The scan counter memory map cells closest to the calling node will then contain a cumulative count that may serve as a prediction of link "busyness" that would be encountered on any path to be extended from the calling node to the called node.

After the scan count memory map cells are so loaded with link "busyness" data, as test is made to ascertain whether a link is available from the calling node to the next node lying in that direction toward the called node which exhibits the lowest predicted busyness. If the link is idle, it is selected. The connection is extended to that next node and the process of busyness mapping and link testing is repeated.

In FIG. 3 is shown a 9×7 section of network 21 embracing both the calling node NCC (i,j) and called node NCC (g,h). For simplicity, the calling node's network 21 coordinates are translated to the original 0,0 of the scan counter memory map and all other nodes in the 9×7 section are viewed from this new reference. The ascertainment of link busyness mapping is begun at the coordinates of the called node. Thus, beginning at the right in the top row of the 9×7 section (ordinate Y=6) it is seen that all of the links at the called node at coordinates 8,6 and also the node at 7,6 are idle, that the horizontal links between each of the NCCs at coordinates 6,6 through 0,6 are seen to be busy and that the node at coordinates 6,6 also has a vertical link in use. Similarly, in the center row (ordinate Y=3) all of the horizontal links between the NCC at coordinates 8,3 and the NCC at coordinates 0,3 are seen to be occupied. In the vertical column (abcissa X=5), the vertical links of NCCs between coordinates 5,5 through 5,0 are busy and the NCCs at coordinates 5,3 and 5,1 also have their horizontal links busy.

The scan counter memory map 203-3 of FIGS. 4 through 6 may be thought of as a replica of the 9×7 section of array 21 pictured in FIG. 3. As scanner 203-1 monitors the busy/idle states of the links at the nodes, counts are placed in the memory cells of the scan counter memory map which are cumulative half-counts of the number of busy links at each node in the rows and columns of nodes beginning at the called node and progressing toward the calling node. Recalling that no links are in use at either coordinates 8,6 or at coordinates 7,6 a zero is entered at the coordinates 8,6 and 7,6 of the scan counter memory map, FIG. 4. Considering only the links of the NCC at coordinates 6,6 its horizontal link to the NCC at coordinates 5,6 and its vertical link to the NCC at coordinates 6,5 are both in use, yielding a half count of link busyness at this node alone of (2/2=1). The cumulative total of half-counts for the row so far is (0+1=1) and this amount is entered at coordinates 6,6 of the scan counter memory map of FIG. 4. At the NCC at coordinates 5,6 the links to the NCC at coordinates 4,6 and to the NCC at coordinates 6,6 are in use, yielding a nodal half-count of 1. The cumulative total of busy links in the row up to coordinates 5,6 is now (1+2/2=2) and this amount is entered at the coordinates 5,6 of the scan counter memory map of FIG. 4. In similar fashion, and progressing leftward along the remainder of row Y=6 two additional links are found to be in use in each NCC and therefore (2/2=1) would be added to the cumulative total of busy links at each subsequent coordinate in the top row of the memory map.

The procedure thus described for the top row of FIGS. 3 and 4 is next repeated for the next-to-the-top and lower rows. At the completion of this operation, the rows of memory cells in the rows of FIG. 4 contain numbers which increase in magnitude from right to left reflecting the busyness of row paths.

Next, a scan is made of the columns of the section of array 21 set forth in FIG. 3, beginning at the column of the called node. Cumulative half-counts of the number of busy links encountered at each NCC in the column are entered into the cells at the corresponding coordinates of the link busyness map, FIG. 5. The process is repeated for each column progressing leftward toward the column of the calling node. In FIG. 6, the half-counts accrued in FIGS. 4 and 5 are added together.

It is immediately apparent by inspecting FIG. 6 that the cumulative totals of "busyness" increase from right to left and from top to bottom so that the nodes in the immediate vicinity of calling node at coordinates 0,0 reflect a "prediction" of the "busyness" of links that would be encountered for a path to be constructed from the calling node toward the called node. Thus, starting at the calling node at coordinates 0,0, a first step of the path toward the called node may be taken via the node at coordinates 0,1 which reflects a remaining path busyness count of 12 or via the node at coordinates 1,0 which reflects a remaining path busyness count of 4. Obviously, the latter node should be preferred since a lower busyness is predicted for a path taken through this node.

GENERAL DESCRIPTION (FIG. 7)

In the illustrative embodiment of the present invention, a number of departures have been made from the structure and mode of operation disclosed in the '124 patent. The manner of testing and marking of links incident to the extension of a switching path through the nodal network has been altered from that described in the '124 patent.

In that patent, after the nodal network control 203 has been furnished the calling and called numbers and the addresses of their corresponding terminations in the nodal switching network 21, a link "busyness" map is constructed so that the scan counter memory map cells closest to the calling node contain a cumulative count that may serve as a prediction of link "busyness" that would be encountered on any path to be taken between the calling node and the called node. After the scan count memory map cells are so loaded with link "busyness" data, the node selection control 203-7 makes a test to ascertain whether a link is available from the calling node to the next node lying in that direction toward the called node which exhibits the lowest predicted busyness. If the link is idle, it is selected. The connection is extended to that next node and the process of busyness mapping and link testing is repeated.

In the present embodiment, link busyness mapping is also performed, but it is done after the least busy network time slot has been determined. The determination of network time slot usage is begun when the calling and called numbers are registered in the input registers 203-2 of nodal network control 203. At this time lead ST is activated to time slot selection circuit 1200 shown in detail in FIG. 12 hereof. Time slot selection circuit 1200 includes a basic clock 601 which advantageously operates at a frequency of 22.528 MHz to define 256 time slots, each consisting of 11 bit-times repeated 8,000 times per second. Clock bus 601C provides the clock signal to each of the terminating circuits associated with an NCC in the nodal network. Each such terminating circuit, such as circuits 201, 202 illustrated in FIG. 7, may provide the appropriate line circuitry to terminate either an ordinary analog voice line to a conventional telephone set or telephone trunk or to interface with a digital transmission system such as the well-known "T1" carrier system manufactured by the Western Electric Company. Where the terminating circuit serves as analog line, suitable A/D converters (not shown) are assumed to be provided for converting analog speech samples into an 8-bit digital code. Of the 11 bit times, 8 are employed for transmitting digitally encoded speech, two are employed as message marking bits, one preceeding and the other following the 8-bit message, and one bit time, to be hereinafter dealt with in some detail in FIGS. 8-12, is used for busy/idle identification and will sometimes hereinafter be referred to as the "busy bit". The busy bit appears on lead BI of cable 1221 which runs between nodal switching network 21 and the time slot selection circuit 1200.

Circuit 1200 includes a time slot usage memory TSUM which identifies that time slot having the least number of connections in network 21. The determination of which time slot is least busy is accomplished by circuit 1200 during one of the two bit-times used to mark the beginning and end of a sample of digitally encoded speech occurring on two successive sequences of 256 time slots each.

After the selected (least busy) time slot is so identified, a control bit for the time slot in the time slot usage memory TSUM is marked, and a link busyness map (FIG. 6) is construed as has been described in the '124 patent except that the map contains a "picture" of link busyness for only the selected time slot, and there is a respective such "picture" of scan counter map 203-3 applicable to each time slot of network 21. When the link busyness map has been constructed for the selected time slot, the testing of available links to the "next" node is carried out and an available link in the appropriate direction is seized for use in constructing a path during the selected time slot. The process is repeated at intervening nodes between the calling and called nodes on each subsequent repetition of the selected time slot until the final link to the called node has been seized. At this time, a complete path between the calling and called nodes has been defined for the selected time slot and the control bit marking the selected time slot in time slot usage memory TSUM is zeroed. While a path selected in the time slot for the desired connection, repetitions of that time slot are then employed for communication between the calling and called nodes on a time division basis by reestablishing the connection 8000 times per second. Connections involving other link paths between other nodes that may have earlier independently been established using the same time slot are also reestablished during each repetition of the time slot.

THE IMPROVED NODAL CROSSPOINT CONFIGURATION (FIG. 8)

As shown in FIG. 8, an array of 14 (rather than 10) crosspoints is provided at each node. Table I, below, lists the fourteen crosspoints in a nodal crosspoint configuration and the links or termination circuits interconnected by its operation. The provision of the additional crosspoints permits separate control of the connection paths from the transmitter $T_T$ and receiver $T_R$ of a termination.

TABLE I

| CROSSPOINT | Link | | | | | |
| | L1 | L2 | L3 | L4 | T | R |
|---|---|---|---|---|---|---|
| 1 | X | X | | | | |
| 2 | X | | X | | | |
| 3 | X | | | X | | |
| 4 | X | | | | X | |
| 5 | X | | | | | X |
| 6 | | X | X | | | |
| 7 | | X | | X | | |
| 8 | | X | | | X | |
| 9 | | X | | | | X |
| 10 | | | X | X | | |
| 11 | | | X | | X | |
| 12 | | | X | | | X |
| 13 | | | | X | X | |
| 14 | | | | X | | X |

Instead of employing the electro-mechanical or gas tube crosspoints in the nodes as alluded to in the '124 patent, a considerable reduction in network wiring and simplifications in the crosspoint marking and control circuitry are achieved by using "Lewis-gate" crosspoints. Gates of this type are described in W. D. Lewis U.S. Pat. No. 2,535,303, issued Dec. 26, 1950. The Lewis-gate type of crosspoint is especially desirable because it can transmit signals such as digital pulses in either direction and because such a crosspoint at a given node can be operated in response to a single control signal without the need to employ the method described in the '124 patent, i.e., to mark the link associated with a crosspoint both at the "present" node and also at the "next" node in order to operate a crosspoint at the "present" node.

In the context of FIGS. 8 and 9 and Table I above, the control signal is applied to a "g—" lead to operate the associated crosspoint. The control of the crosspoints of FIG. 8 is delivered over leads g1 through g14 from decoder 1001 at the output of the time slot memory TSM of FIG. 10. Memory TSM stores a word containing from one to six bits that defines which crosspoint can simultaneously be operated to define noninterfering connections. Tables IIA and IIB below show, respectively, the combination of two and three crosspoints which may simultaneously be so operated during a time slot. For example, in the first row of Table IIA, if only the single "F" bit is the pattern present in a time slot word, crosspoints 2 and 7 would be activated to noninterferingly interconnect link L1 with L3 and link L2 with L4. If the pattern "E,F" is present in a time slot word of memory TSM, as depicted in the third row of Table IIA, crosspoints 1 and 10 are operated to interconnect link L1 with L2 and link L3 with L4.

TABLE IIA

| TS MEMORY CODE | | | | | | CROSSPOINTS | | | | | | | | | | | | | |
|---|---|---|---|---|---|---|---|---|---|---|---|---|---|---|---|---|---|---|---|
| A | B | C | D | E | F | 1 | 2 | 3 | 4 | 5 | 6 | 7 | 8 | 9 | 10 | 11 | 12 | 13 | 14 |
|   |   |   |   |   | X |   | X |   |   |   |   | X |   |   |   |   |   |   |   |
|   |   |   |   | X |   |   |   | X |   |   | X |   | X |   |   |   |   |   |   |
|   |   |   |   | X | X | X |   |   |   |   |   |   |   |   | X |   |   |   |   |
|   |   |   | X |   |   |   |   |   |   |   | X |   | X |   |   |   |   |   |   |
|   |   |   | X |   | X |   |   |   |   |   | X | X |   |   |   |   |   |   |   |
|   |   |   | X | X |   |   |   |   |   |   | X |   |   |   | X |   |   |   |   |
|   |   |   | X | X | X |   |   |   |   |   |   | X | X |   |   |   |   |   |   |
|   |   | X |   |   |   |   |   |   |   |   |   | X | X |   |   |   |   |   |   |
|   |   | X |   |   | X |   |   |   |   |   | X |   |   |   | X |   |   |   |   |
|   |   | X |   | X |   |   | X |   | X |   |   |   | X |   |   |   |   |   |   |
|   |   | X |   | X | X |   | X | X |   | X |   |   | X |   |   |   |   |   |   |
|   |   | X | X |   |   |   |   |   |   |   |   |   | X | X |   |   |   |   |   |
|   |   | X | X |   | X |   |   | X |   |   |   | X |   |   | X |   |   |   |   |
|   |   | X | X | X |   |   |   |   | X |   |   |   |   |   | X |   |   |   |   |
|   |   | X | X | X | X |   |   |   |   | X |   |   |   |   | X |   |   |   |   |
| X |   |   |   |   |   |   |   |   | X |   |   |   |   |   |   |   | X |   |   |
| X |   |   |   |   |   |   |   | X | X |   |   |   |   |   |   |   | X |   |   |
| X |   |   |   |   | X |   | X |   |   |   | X |   |   |   |   |   | X |   |   |
| X |   |   |   | X |   |   | X | X | X |   |   | X |   |   |   | X |   |   |   |
| X |   |   | X |   |   |   |   |   |   | X |   |   |   | X |   |   |   |   |   |
| X |   |   | X |   | X |   |   |   |   |   |   |   |   | X | X |   |   |   |   |
| X |   |   | X | X |   |   | X | X |   |   |   |   | X |   |   | X |   |   |   |
| X |   | X |   |   |   |   | X | X | X | X |   |   |   |   |   | X |   |   |   |
| X | X |   |   |   |   |   |   |   | X |   | X |   |   |   |   |   | X |   |   |
| X | X |   |   |   | X |   |   | X |   | X |   |   |   |   |   |   |   | X |   |
| X | X |   | X |   |   |   |   | X | X |   |   |   |   |   |   |   |   |   | X |
| X | X |   | X | X |   |   |   |   | X |   |   | X |   |   |   |   |   |   | X |

In Table IIB, the patterns of crosspoint operations for three simultaneously operated crosspoints are shown. In the first example, the pattern "A,F" in a time slot word of memory TSM calls for the operation of crosspoints 4, 9, and 10. Referring back to Table I, it is seen that these operated crosspoints dictate the interconnection of termination link T with link L1, termination R with link L2, and the interconnection of link L3 with link L4. The 14 crosspoints of the given node may be operated on any one of 128 "going" and on any of the 128 "returning" time slots available to the network.

TABLE IIB

| TS MEMORY CODE | | | | | | CROSSPOINTS | | | | | | | | | | | | | |
|---|---|---|---|---|---|---|---|---|---|---|---|---|---|---|---|---|---|---|---|
| A | B | C | D | E | F | 1 | 2 | 3 | 4 | 5 | 6 | 7 | 8 | 9 | 10 | 11 | 12 | 13 | 14 |
| X |   |   |   |   | X |   |   |   | X |   |   |   |   | X | X |   |   |   |   |
| X |   |   |   | X |   |   |   |   | X |   |   | X |   |   |   |   | X |   |   |
| X |   |   |   | X | X |   |   |   | X |   | X |   |   |   |   |   |   |   | X |
| X |   |   | X |   |   |   |   |   |   |   | X |   | X |   | X |   |   |   |   |
| X |   |   | X |   | X |   |   |   |   | X |   |   | X |   |   |   | X |   |   |
| X |   |   | X | X |   |   |   | X | X |   | X |   |   | X |   |   |   |   |   |
| X |   |   | X | X | X |   |   | X | X | X |   | X |   |   |   | X |   |   |   |
| X |   | X |   |   |   |   |   |   |   | X |   |   |   |   | X | X |   |   |   |
| X |   | X |   |   | X |   | X | X |   |   |   | X | X |   |   |   | X |   | X |
| X |   | X |   | X |   |   | X |   |   |   |   | X | X |   |   |   | X |   |   |
| X |   | X |   | X | X |   | X |   | X | X |   |   |   |   | X |   | X |   |   |
| X |   | X | X |   |   |   | X | X |   | X |   |   |   |   |   |   | X | X |   |

A further simplification over the circuitry of the '124 patent is achieved in that a separate sleeve lead path extending throughout the length of a network path connection is no longer required. Instead, one test lead associated with each single conductor link path at the NCC that is used for the transmission of communications signals is sampled for the appearance of the "busy-bit" during the appropriate time slot. If a crosspoint of the node is in use on any of the time slots, the "busy bit" that is appended to the digital signals comprising the transmitted intelligence will appear on each of the links interconnected by the crosspoint in use during bit-time 2 of the 11-bit time slot.

Busy bits may also appear on a pair of leads L1t through L4t, Tt, Rt, if these leads have been marked (via gate CPM—) by the crosspoint marking and control circuitry of FIGS. 7 and 8 of the '124 patent. Bit-time 2 is defined by the energization of lead B/I at the input of gate BIT, FIG. 8. The appearance of a busy-bit on any of links L1 through L4 and T, R at a given node is reported to the scanner 604 (FIG. 6 of patent '124) via time slot scanning gate TSSG shown in FIG. 11 hereof when gate BIT, FIG. 8, is enabled. Gate BIT is enabled during bit-time 2 when lead NS is energized by lead SEL, FIG. 5, of the '124 patent. The appearance of the busy-bit on any of links L1 through L4 and T, R, is conveyed to FIG. 11 over respective AND-gates BI1t through BI4t and BITt, BIRt via leads L1T through L4t and Tt, Rt.

CROSSPOINT CONTROL (FIGS. 10 AND 11)

If the given node of FIG. 8 has been selected for the purpose of operating one of its crosspoints to interconnect two links (during a "least busy" time slot which has been selected in a manner hereinafter to be more fully described in connection with FIG. 12), a check is first made to ascertain that the crosspoint to be operated is not associated with a link that may be involved in some other connection that was previously established through the node. Let it be assumed that the link busyness mapping, which has been performed as described above in connection with FIGS. 3–6, indicates that, at the illustrative NCC shown in FIG. 8, link T should be connected to link L2. This requires the operation of crosspoint 8. (See Table I.) It must now be determined whether link L2 is in fact available or whether it is already in use on some other connection. The process control state sequence generator of FIG. 5 of the '124 patent generates various state phase signals. State phases $\phi 2$, $\phi 3$, and $\phi 4$ of this generator are employed to set flip-flop 1101, FIG. 11.

As described in the '124 patent, during phase $\phi 2$, a proposed "next" NCC at advanced coordinates in the X direction is selected and tests are made of the busy/idle potential of the links to this node. If links to the proposed node in the advanced X direction are busy, a test is made to determine whether "regress" links are available. During state phase $\phi 3$, busy/idle potentials of the links to a proposed "next" node at advanced coordinates in the Y direction are tested in a similar fashion. These busy/idle tests required the use of sleeve leads at the crosspoints. The sleeve leads of the links at the selected NCC were brought down to the common crosspoint mark control 203-6 by signal distributor 203-5 operating a "41" relay at the selected NCC which connected the sleeve leads to conductors T1–T4 at circuit 203-6. During state phase $\phi 4$, a decision is made as to whether the proposed "next" node in the advance X direction (sometimes called node II in the '124 patent) or in the proposed Y direction (sometimes called node III) is less busy.

Figure 11:
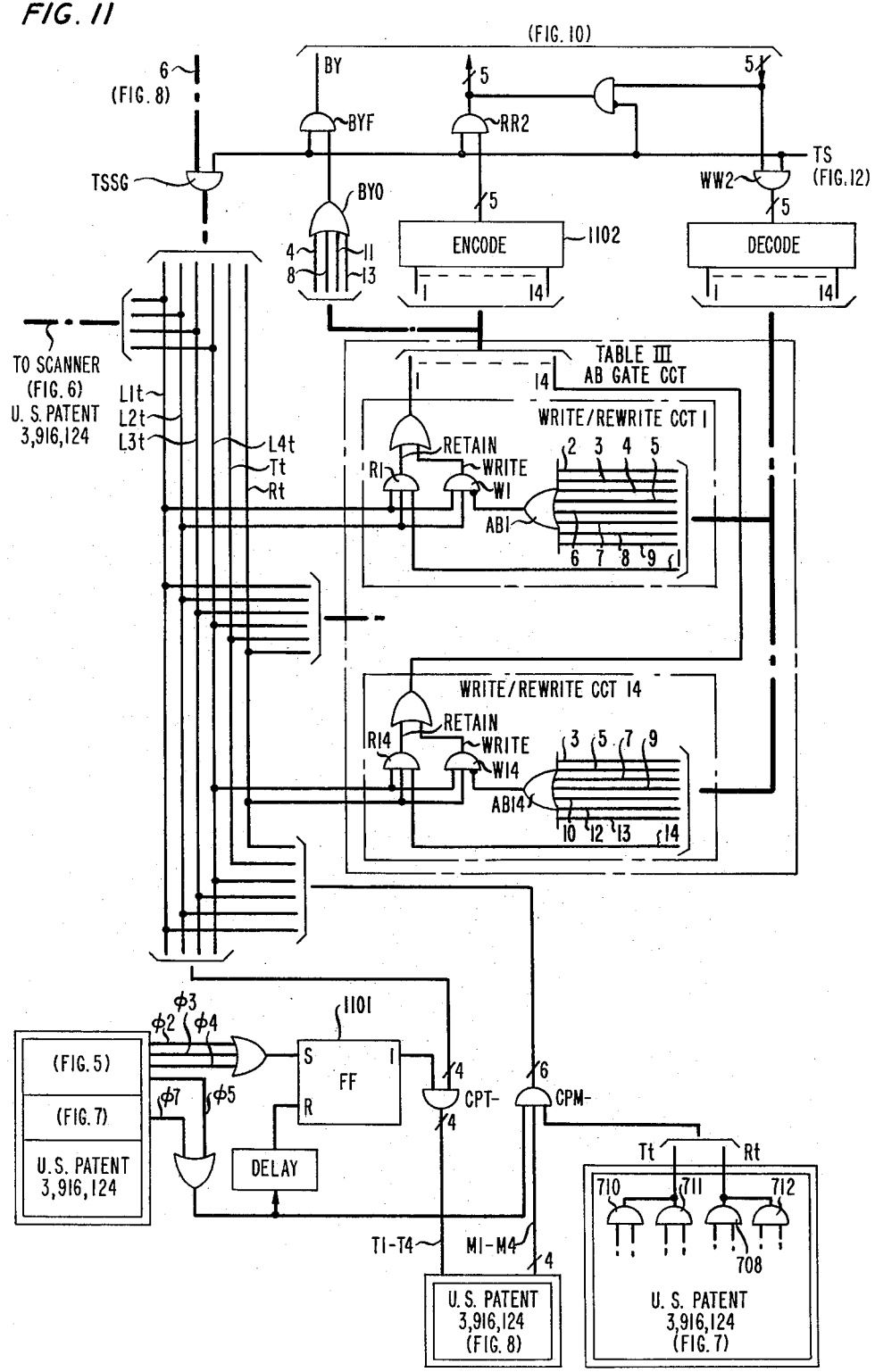
FIG. 11 show the remainder of the control for a nodal crosspoint configuration, including the write and rewrite circuitry for the time slot memory of FIG. 10.

Flip-flop 1101, FIG. 11, when set, enables gate CPT— to extend the continuity of leads L1t–L4t, Tt, Rt of the node to leads T1–T4 of the crosspoint testing and marking circuitry of FIG. 8 of the '124 patent. (The continuity of the links' communication paths L1–L4, T,R of FIG. 8 is extended to link test leads L1t–L4t, Tt, Rt when gate BIT is enabled.) If lead L2t exhibits the idle condition i.e., its busy-bit is zero, the crosspoint marking and control circuit of the '124 patent during state phase $\phi 5$ (or state phase $\phi 7$ in the case of a network connection completed through to the called node) will mark lead M2 of leads M1–M4 with a busy-bit which is applied through gate CPM— to appear on link lead 12t. Write gate W2 will be enabled by the appearance of busy bits on leads L2t and Tt (unless inhibited as described below by gate AB2) and crosspoint 8 will be written into time slot memory TSM.

The Table III AB gate circuitry of FIG. 11 is provided for the updating of time slot memory TSM of FIG. 10. The R— and W— gates of the write/rewrite circuits 1–14 comprising the Table III AB gate circuitry sense the appearance of busy-bits on pairs of leads L1t through L4t and Tt, Rt, and relate the appearance of the busy bits on pairs of leads to the crosspoint numbers reported out of the time slot memory. For example, when busy bits appear on leads L1t and L2t, indicating (see Table I) that crosspoint 1 of FIG. 8 is operated, gate R1 of the uppermost write/rewrite circuit 1 in the Table III AB gate circuitry of FIG. 11 will have two of its inputs energized. If, at this time, time slot memory TSM causes the third input of gate R1 to be energized because it has previously stored the designation for crosspoint 1, gate R1 will be operated and, via encoder 1102 and gate RR2, will cause the appropriate bit pattern for crosspoint 1 (see Table II) to be rewritten in the time slot memory TSM.

When two crosspoints are in use at the node on the same time slot, busy bits will appear on two pairs of conductors L1t through L4t and Tt, Rt. The two pairs of busy bits will be detected by two of gates R1–R14 belonging to two of write/rewrite circuits 1 through 14, respectively. If time slot memory TSM fails to read out a crosspoint number corresponding to the crosspoint number that is, in effect, detected by the R-gates of write/rewrite circuits 1–14, the respective R-gate will not be enabled, and the crosspoint number will not be retained in time slot memory TSM.

As mentioned above, leads L1t, through L4t, Tt, Rt, may be marked via gate CPM— on either phase $\phi 5$ or $\phi 7$ of the control state sequence generator by the crosspoint testing and marking circuitry of FIGS. 7 and 8 of the '124 patent. If, however, time slot memory TSM, FIG. 10, has stored the number of an "incompatible" crosspoint, the leads marked by the appearance of busy-bits will not cause an associated crosspoint number to be written into the time slot memory because the corresponding write-gate W— will be inhibited. For example, if leads L1t and L2t have been marked via gate CPM— because the crosspoint marking and control circuitry desires to interconnect links L1 and L4 by the operation of crosspoint 1 in FIG. 8, but any of crosspoints 2, 3, 4, 5, 6, 7, 8, or 9 have priorly been operated, crosspoint 1 should not be operated since Table I indicates that these crosspoints are also associated with link L1, and their simultaneous operation with crosspoint 1 would make for double connections to link L1. Likewise, crosspoint 1 should not be operated if the time slot memory reads out crosspoint numbers 6, 7, 8, or 9 since these crosspoints are associated with link L2. Table III below lists the inhibiting inputs for gates W— that are furnished by the time slot memory via gates AB—.

TABLE III

| LINKS INTER-CONNECTED | CROSSPOINT OPERATED | INHIBITS DELIVERED THROUGH AB GATE |
|---|---|---|
| 1,2 | 1 | 2,3,4,5,6,7,8,9 |
| 1,3 | 2 | 1,3,4,5,6,10,11,12 |
| 1,4 | 3 | 1,2,4,5,7,10,13,14 |
| 1,T | 4 | 1,2,3,5,8,11,13 |
| 2,3 | 6 | 1,2,7,8,9,10,11,12 |
| 2,4 | 7 | 1,3,6,8,9,10,13,14 |
| 2,T | 8 | 1,4,6,7,9,11,13 |
| 3,4 | 10 | 2,3,6,7,11,12,13,14 |
| 3,T | 11 | 2,4,6,7,8,13,12 |
| 4,T | 13 | 3,4,7,8,10,11,14 |
| 1,R | 5 | 1,2,3,4,9,12,14 |
| 2,R | 9 | 1,5,6,7,8,12,14 |
| 3,R | 12 | 2,5,6,7,9,11,14 |
| 4,R | 14 | 3,5,7,9,10,12,13 |

As mentioned above, the NCC of FIG. 8 may have up to three of its crosspoints simultaneously operated on a time slot. When the terminating circuit associated with the NCC is involved in a time slot connection, it is necessary that the BY flip-flop of FIG. 10 associated with the NCC be operated. In FIG. 11, OR-gate BYO senses the output of the Table III AB-gate circuit for the activation of leads corresponding to crosspoints 4, 8, 11, or 13. Referring to FIG. 8, these crosspoints are those associated with the associated terminating circuits, link T. Whenever any of the leads at the input of gate BYO, FIG. 11, are energized, flip-flop BY, FIG. 10, is set and remains so throughout the duration of both sequences of 128 "going" and "return" time slots. The BY flip-flop is so operated to indicate tha the associated terminating circuit is busy. It is to be noted that a termination can be used on only one going and return set of time slots since that time slot identifies the single call on which the terminating circuit is involved. On the other hand, any of links L1–L4 can be used on more than one time slot. So long as busy bits appear on lead T at the input of gate 1011 of FIG. 10 during one time slot of each frame, gate 1010 associated with the one output of the BY flip-flop remains inhibited. When terminating circuits become idle, the busy bit will disappear from lead T, gate 1010 will be unblocked, and the one signal at the output of the BY flip-flop will be applied to the −1 lead indicating the release of the established connection. Flip-flop BY will then be reset after a short delay. The operations ensuing upon the activation of the −1 lead are described in connection with the description in FIG. 12.

The time slot memory for each NCC, such as time slot memory TSM in FIG. 10 which controls the NCC of FIG. 8, represents a map of the busy links at the NCC. Before a new connection is established, it is necessary to remove indications of crosspoints in use. This takes place automatically. When a crosspoint is no longer needed, the busy bit of the 11-bit time slot is reset to zero by the terminating circuit. For example, the idle state of an analog line (not shown) at the terminating circuit is detected by the state of the so called "M-lead" (not shown), whereas the idle state of a digital line, such as that used in the aforementioned T1 carrier system, is revealed by a pattern of the eighth bit of the channel. When such a line becomes idle, busy bits will no longer appear on a pair of leads L1$t$ through L4$t$, T$t$, R$t$, of FIG. 11, but the time slot memory TSM will continue to read out the number of the crosspoint that had been (and still is) operated on the connection. Two of the inputs of the R-gate of write/rewrite circuits 1–14 corresponding to the operated crosspoint will not be enabled, however, because of the disappearance of the busy-bits. Accordingly, the priorly active time slot number will "automatically" not be rewritten into the time slot memory. When the crosspoint number is thus eliminated from time slot memory TSM, decoder 1001 will remove energization from the corresponding one of the leads from g1 through g14, and the crosspoint will be released.

Figure 12:
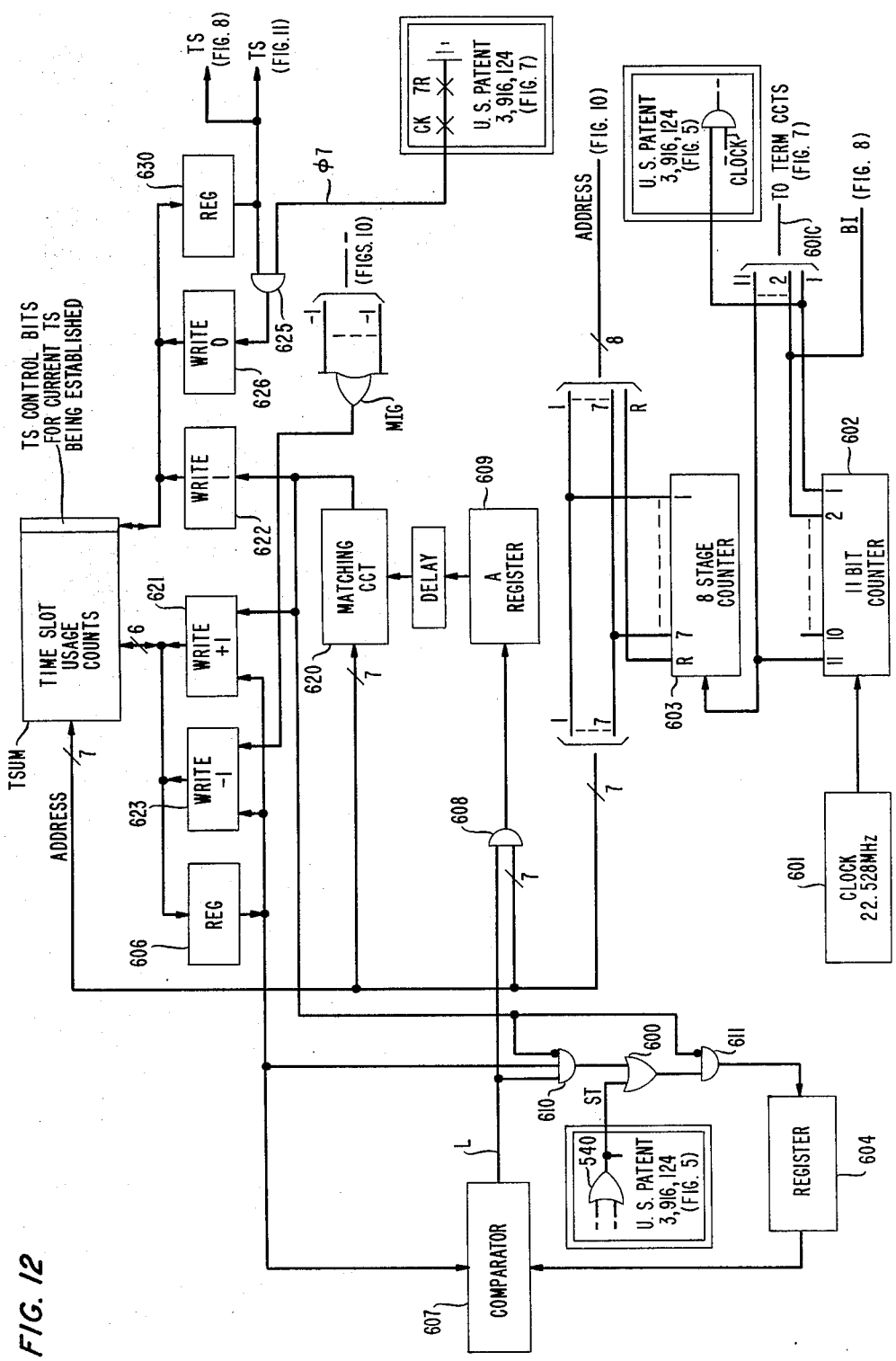
FIG. 12 shows the time slot selection circuitry including the time slot usage counter memory for the nodal network.

DESCRIPTION OF FIG. 12 (Time Slot Selection Circuit)

The basic clock rate of the time division nodal network is set by master clock 601. Assuming that each time slot will consist of 11 bit times, clock 601 should run at a rate of 22.528 MHz. This will provide for sampling 256 time slots, each consisting of 11 bit times, at the rate of 8000 per second. The 11 bit times are provided at the output of 11-bit counter 602. The bit-time 2 output of counter 602 energizes the busy idle sampling lead BI which is connected, inter alia, to one input of busy idle test gate BIT in FIG. 8. At the end of each 11th bit-time output pulse provided by counter 602, 8-stage counter 603 is energized. Counter 603 generates a sequentially different 8-bit pattern at its output leads each time it is energized by counter 602. Seven of the eight bits are used to define 128 locations in time slot memory TSM of FIG. 10. These locations are repeated with the R lead marked for another 128 time slots during which the reverse direction of transmission takes place. The decode circuit 1001, FIG. 10, takes this into account on connections to node terminations by operating the appropriate one of the T crosspoints 4, 8, 11 and 13 on one series of 128 time slots and the appropriate one of the R crosspoints 5, 9, 12 and 14 on the other. The seven most significant output leads of counter 603 define 128 locations in time slot usage count memory, TSUM.

The time slot selection circuitry of FIG. 12 is brought into operation when lead ST is energized incident to the registration of the addresses of the calling and called nodes in the "500 registers" depicted in FIG. 5 of the '124 patent. Energization of lead ST jam-sets register 604 to a maximum count number which, advantageously, may be 64. The number 64 is arrived at by estimating the maximum number of calls per time slot for the illustrative embodiment. Assuming that of the 256 time slots, half may be used for call originations and that nodal network 21 contains 10,000 NCCs having an average occupancy of 0.5, it turns out that there will be an average of 39 connections per time slot. Assuming that the highest occupancy per node will not exceed 0.8, an estimated absolute maximum of 64 calls per time slot is assumed. Accordingly, time slot usage memory TSUM should provide at each of its 128 originating time slot locations storage for six bits to identify the actual number of connections in use per time slot. In addition to the six bits, a single additional bit is provided per originating time slot location to identify, in the manner hereinafter to be described, the current time slot being employed for the establishment of a switching path through the nodal network.

When time slot usage counter memory TSUM is addressed by counter 603, the 6-bit pattern representing the number of simultaneous calls in network 21 employing that time slot is read out into register 606 and then applied to the upper input of comparator 607. The lower input of comparator 607 receives the contents of register 604, which presently has been jam-set to its maximum count of 64. Comparator 607 energizes its output lead L whenever the count in register 606 is lower than the count in register 604. When lead L is so energized, gate 608 is enabled to enter the 7-bit address (of the node which provided the usage count in register 606) into A register 609. When output lead L is energized, the usage count is conveyed from register 606 via gates 610, 600, and 611 into register 604 to replace the previous contents thereof.

Each time counter 603 addresses a different time slot location, the process of comparing usage counts read out from memory TSUM with the count recorded in register 604 is repeated. After counter 603 has generated a complete sequence of 128 addresses, A register 609 will have the address of the time slot in memory TSUM having the lowest usage count.

Counter 603 then begins a second sequence of generating addresses and, during this second sequence, one address that is generated will match the address recorded in A register 609. This condition is detected by matching circuit 620 which energizes "Write +1", circuit 621 and "Write 1" circuit 622 and inhibits gates 610 and 611. The activation of circuit 621 augments the count of time slot usage register in register 606 for the addressed time slot location in memory TSUM. The activation of circuit 622 records a 1-bit in the right-most bit position of the addressed time slot location. This right-most bit, when set to "1", identifies the time slot as having been seized for use to establish a connection through network 21. At the same time that the "1" bit is written into memory TSUM, register 630 energizes lead TS to FIG. 11.

When a network path has finally been extended between the calling and called nodes in network 21, a "state phase 7" signal is generated in the manner described in the '124 patent. This signal activates gate 625 during the appropriate time slot thereby causing write 0 circuit 626 to overwrite the 1-bit that previously identified the time slot as having been seized to establish a network connection.

The discontinuance of a network path during a time slot is signaled by the activation of one of the "−1" leads of OR-gate DOR by a node circuit (FIG. 8). OR-gate DOR, in turn, activates decrement 1 circuit 623 which reduces the usage count of the address time slot.

Accordingly, there has been described a time division nodal network wherein a call may be extended over a digital link path through a number of intervening NCCs to link together calling and called termination circuits on a given network time slot. Other calls involving other NCCs may make use of the same time slot. The number of calls utilizing each time slot in the network are counted, and when a connection is to be set up for a new call, any one of the least busy time slots in the network is selected. After the network time slot is selected, least busy link paths that define the shortest connection path between calling and called NCCs are selected using the link busyness mapping of the aforementioned '124 patent. It is an advantage of the illustrative embodiment, which dispenses with the need for separate tip ring and sleeve conductors at the crosspoints of the NCCs that all of the elements shown in FIGS. 8, 10, and 11, pertaining to a given NCC such as NCC (i,j) of FIG. 7, may be fabricated on a single integrated circuit chip. Further, a plurality of such NCCs may be fabricated on a single chip, and it should be appreciated that the apparatus and methods herein described may also be employed to render my previous systems described in the aforementioned U.S. Pat. No. 3,906,175 patent and application Ser. No. 905,214, operable on a time-division basis. The foregoing are deemed to be illustrative of the principles of the present invention. Further and other modifications may be devised by those skilled in the art without, however, departing from the spirit and scope thereof.

I claim

1. A nodal switching network including a plurality of link paths and nodal crosspoint configurations operable to interconnect said link paths, terminating circuits associated with said nodal configurations and means for establishing a plurality of independent time division connections through said nodal configurations to link calling and called ones of said terminating circuits, said means for establishing said connections comprising:
   means for defining for said network a repetitive series of plural-bit time slots,
   means for assigning a time slot for the establishment of a network connection on a call between a calling and called one of said terminating circuits,
   means for accruing a count of the number of calls assigned to each of said time slots in said network,
   means controlled by said count accruing means for controlling said assigning means to assign a least busy one of said time slots to said call, and
   means operable at each said nodal crosspoint configuration during said assigned time slot for selecting the link path appropriate to the extension of a network path connection between said calling and called circuits.

2. A nodal switching network according to claim 1 wherein said nodal crosspoint configurations each comprises a plurality of digital transmission gates for interconnecting said link paths, and wherein said terminating circuits include means controlled by said time slot defining means for applying plural bit intelligence and busy/idle signals to said transmission gates.

3. The nodal switching network of claim 2 wherein said means for defining said plural-bit time slots comprises counter means for identifying bit positions assignable for the transmission over said link paths of intelligence and the busy/idle state of said link paths.

4. A nodal switching network according to claim 2 wherein said means for selecting said path comprises means for detecting the appearance of said busy/idle signals on selected ones of said link paths.

5. A nodal switching network according to claim 4 wherein said busy/idle signals include a busy bit capable of occupying a predetermined bit position of said plural bit time slots.

6. A nodal switching network according to claim 5 further comprising means for operating the one of said digital transmission gates interconnecting a pair of said selected link paths when said busy bit appears on neither of said paths of said pair.

7. A nodal switching system comprising a network of link paths and nodal crosspoint configurations operable to interconnect said link paths, a plurality of terminating circuits associated with said nodal configurations, means for according said network a plurality of multibit communications time slots, means for determining network time slot occupancy to derive a measure of time slot busyness, and means for assigning pairs of calling and called ones of said terminating circuits to said time slots, including means controlled by said measure of time slot busyness for assigning different ones of said pairs of terminating circuits to occupy the least busy ones of said time slots.

8. A nodal switching system according to claim 7 further comprising means operable during each of said least busy ones of said time slots for selecting a path between said calling and called one of said terminating circuits traversing the least busy ones of said nodal crosspoint configurations.

9. A nodal switching system according to claim 8 wherein said link busyness mapping means includes means for accruing a count of those links which are busy on each of said time slots at each crosspoint configuration lying between the coordinates of calling and called ones of said pairs of terminating circuits.

10. A nodal switching network comprising a plurality of link paths and nodal crosspoint configurations operable to interconnect said link paths, terminating circuits associated with said nodal configurations and means for establishing a plurality of independent time division connections through the least busy ones of said nodal configurations to link calling and called ones of said terminating circuits.

11. A nodal switching network according to claim 4 wherein said means for selecting said path comprises means responsive to said detecting means for accruing a count of busy ones of said link paths at each of said nodes and means responsive to said count for controlling the selection of said link path traversing the least busy ones of said nodes.

* * * * *